United States Patent
Robertson et al.

(10) Patent No.: US 9,602,473 B2
(45) Date of Patent: Mar. 21, 2017

(54) SECURE MESSAGE FORWARDING WITH SENDER CONTROLLED DECRYPTION

(75) Inventors: David Joseph Robertson, Richardson, TX (US); John French Kalan, Dallas, TX (US); Mark Stephen DeMichele, Dallas, TX (US); Bryan Adam Joyner, Richardson, TX (US); Charles Anthony Rego, Dallas, TX (US); Dorwin Thomas Shields, Jr., Allen, TX (US); Caleb Rhoads Spring, Dallas, TX (US)

(73) Assignee: ZixCorp Systems, Inc., Dallas, TX (US)

(*) Notice: Subject to any disclaimer, the term of this patent is extended or adjusted under 35 U.S.C. 154(b) by 187 days.

(21) Appl. No.: 13/605,061

(22) Filed: Sep. 6, 2012

(65) Prior Publication Data
US 2014/0068262 A1 Mar. 6, 2014

(51) Int. Cl.
*H04L 9/32* (2006.01)
*H04L 29/06* (2006.01)

(52) U.S. Cl.
CPC ...... *H04L 63/0428* (2013.01); *H04L 63/0815* (2013.01); *H04L 63/101* (2013.01)

(58) Field of Classification Search
CPC ............ H04L 63/0428; H04L 63/0471; G06Q 10/107; G06F 21/606; G06F 21/645
See application file for complete search history.

(56) References Cited

U.S. PATENT DOCUMENTS

| | | | | |
|---|---|---|---|---|
| 8,837,739 B1* | 9/2014 | Sexton | ................... | H04L 9/0827 380/278 |
| 2004/0181668 A1* | 9/2004 | Blew | ..................... | G06F 21/606 713/165 |
| 2005/0071632 A1* | 3/2005 | Pauker | ................ | H04L 63/0442 713/165 |
| 2006/0259767 A1* | 11/2006 | Mansz | .................... | G06F 21/51 713/168 |
| 2007/0269041 A1 | 11/2007 | Bhatnagar et al. | | |
| 2009/0150675 A1* | 6/2009 | Cook | ................... | G06Q 10/107 713/175 |
| 2011/0113109 A1 | 5/2011 | LeVasseur et al. | | |
| 2011/0202756 A1* | 8/2011 | West | ..................... | H04L 12/584 713/152 |

(Continued)

OTHER PUBLICATIONS

"Basic Encryption and Delivery Methods—A ZixIt Technology Primer", prior art from U.S. Appl. No. 09/970,147.*

(Continued)

*Primary Examiner* — Carl Colin
*Assistant Examiner* — Quy Pham
(74) *Attorney, Agent, or Firm* — Baker Botts L.L.P.

(57) ABSTRACT

Methods, apparatuses, and computer program products are provided for facilitating the secure transmission and storage of data. In this regard, a method is provided that comprises causing data encrypted by a sender system to be received at a service provider system; causing the data as encrypted by the sender system to be stored at the service provider system; receiving a request for the data from a recipient system; determining the recipient system is authorized to receive the data; and causing the data as encrypted to be transmitted to the sender system.

55 Claims, 8 Drawing Sheets

(56) References Cited

U.S. PATENT DOCUMENTS

| | | | |
|---|---|---|---|
| 2012/0102326 A1* | 4/2012 | Palekar | G06F 21/604 |
| | | | 713/168 |
| 2013/0111560 A1* | 5/2013 | Arenas | H04L 67/16 |
| | | | 726/4 |
| 2014/0298009 A1* | 10/2014 | Hattori | H04L 9/30 |
| | | | 713/155 |

OTHER PUBLICATIONS

Digicert, "Behind the Scenes of SSL Cryptography", https://www.digicert.com/ssl-cryptography.htm.*
European Search Report of EP 13 18 3441 dated Mar. 25, 2014.

* cited by examiner

SECURE MESSAGE FORWARDING WITH SENDER CONTROLLED DECRYPTION

FIELD

Embodiments of the present invention relate to securely delivering electronic messages over a network, including apparatuses, systems, methods, computer program products and other means for facilitating secure storage and transmission of electronic data.

BACKGROUND

Millions of email messages are sent every day. Ordinary email messages are not secure because the message content is transmitted in clear text. While some email messages may be suitable or even intended for public dissemination, many email messages are not.

People often email personal, private, financial, business-sensitive and other non-public information. Despite the private nature of these email messages, many are sent over public networks without any security precautions. As a result, people assume the risk that their private information may become public.

Cryptography is a method for securing email message content. Because secure emails are encrypted before transmission, only the users having the necessary decryption key are able to decrypt and read the message contents.

The use of a secure webmail portal is a robust way to protect email privacy between an enterprise having encryption capabilities and consumers or businesses which do not have matching decryption capabilities. Typically, the originating enterprise will have an on-site Gateway device that can encrypt directly to parties with the ability to decrypt, and encrypt to the secure webmail portal as an alternative for parties who are less well equipped. Such parties can then access the messages using SSL/TLS browser security following email notification with provision of an appropriate mail access url.

When the secure webmail portal is provided 'in-the-cloud' by a service provider, the service provider necessarily has possession of both the encrypted message contents and the decryption key. This is necessary because the service provider must be able to decrypt the contents to enable message rendering through the recipient user's browser. 'Cloud-based' services are desirable as operation and maintenance of the associated technologies is quite complex and places a significant support burden on an enterprise's staff. However, using such services provides some risk to an enterprise's data as the enterprise does not have full control of their data because the service provider has access to the contents of the enterprise's protected data.

BRIEF SUMMARY

Embodiments discussed herein include apparatuses, systems, methods, computer program products and other means for providing encryption services for email and other types of electronic messaging systems and electronic data storage systems.

In some example embodiments, a method is provided to facilitate secure transmission of data where a service provider system preforms a method comprising receiving data encrypted by a sender system; storing the data as encrypted by the sender system; receiving a request for the data from a recipient system; determining the recipient system is authorized to receive the data; and transmitting the data as encrypted to the sender system.

In some embodiments, the method may comprise causing the data to be encrypted a second time by the service provider system, after receiving the data from the sender system and prior to the service provider system storing the data.

In some example embodiments, a method is provided that comprises causing secure transmission of data between a sender system and a recipient system. The method may comprise a sender system performing steps comprising encrypting data; transmitting the data as encrypted to a service provider system; receiving authenticating data generated by a recipient system; generating authentication data indicating the recipient authenticating data is valid; transmitting the authentication data to the recipient system; requesting the data as encrypted from the service provider system; receiving the data as encrypted from the service provider system; decrypting the data; and transmitting the data as decrypted to the recipient system.

In some example embodiments, a method is provided that comprises causing a recipient system to receive secure transmission of data from a sender system. The method may comprise receiving, by a recipient system, a user input associated with retrieving data from a service provider system, wherein the data is stored by the service provider system and the data was encrypted by a sender system; the recipient system providing authentication data; and receiving the data as decrypted from the sender system.

In further example embodiments, an apparatus is provided that includes at least one processor and at least one memory including computer program code with the at least one memory and the computer program code being configured, with the at least one processor, to cause the apparatus to at least receive data encrypted by a sender system; store the data as encrypted by the sender system; receive a request for the data from a recipient system; determine the recipient system is authorized to receive the data; and transmit the data as encrypted to the sender system.

In other example embodiments, an apparatus is provided that includes at least one processor and at least one memory including computer program code with the at least one memory and the computer program code being configured, with the at least one processor, to cause the apparatus to at least encrypt data; transmit the data as encrypted to a service provider system; receive authenticating data generated by a recipient system; generate authentication data indicating the recipient authenticating data is valid; transmit the authentication data to the recipient system; request the data as encrypted from the service provider system; receive the data as encrypted from the service provider system; decrypt the data; and transmit the data as decrypted to the recipient system.

In other example embodiments, an apparatus is provided that includes at least one processor and at least one memory including computer program code with the at least one memory and the computer program code being configured, with the at least one processor, to cause the apparatus to at least receive a user input associated with retrieving data from a service provider system, wherein the data is stored by the service provider system and the data was encrypted by a sender system; provide authentication data; and receive the data as decrypted from the sender system In yet further example embodiments, a computer program product may be provided that includes at least one non-transitory computer-readable storage medium having computer-readable program instructions stored therein with the computer-readable program instructions including program instructions configured to cause receiving data encrypted by a sender system; storing the data as encrypted by the sender system; receiving a request for the data from a recipient system; determining the recipient system is authorized to receive the data; and transmitting the data as encrypted to the sender system.

In other example embodiments, a computer program product may be provided that includes at least one non-transitory computer-readable storage medium having computer-readable program instructions stored therein with the computer-readable program instructions including program instructions configured to cause encrypting data; transmitting the data as encrypted to a service provider system; receiving authenticating data generated by a recipient system; generating authentication data indicating the recipient authenticating data is valid; transmitting the authentication data to the recipient system; requesting the data as encrypted from the service provider system; receiving the data as encrypted from the service provider system; decrypting the data; and transmitting the data as decrypted to the recipient system.

In other example embodiments, a computer program product may be provided that includes at least one non-transitory computer-readable storage medium having computer-readable program instructions stored therein with the computer-readable program instructions including program instructions configured to cause receiving a user input associated with retrieving data from a service provider system, wherein the data is stored by the service provider system and the data was encrypted by a sender system; the recipient system providing authentication data; and receiving the data as decrypted from the sender system.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The use of a secure webmail portal is a robust way to protect email privacy between an enterprise having encryption capabilities and consumers or businesses which do not have matching decryption capabilities. An enterprise may create and encrypt message contents which are then transmitted to a secure webmail portal. The secure webmail portal generates a notification with an appropriate mail access address, such as a mail address url, that is transmitted to the intended recipient's mail system.

When the secure webmail portal is provided 'in-the-cloud' by a service provider, the service provider necessarily has possession of both the encrypted message contents and the decryption key. This is necessary because the service provider must be able to decrypt the contents to enable message rendering through the recipient user's browser.

As a result, many enterprises have concerns about the security of their protected content. By having access to the encrypted content and the decryption key, a service provider may intentionally or inadvertently allow for the release of an enterprise's protected content without the authorization of the enterprise. As a result, enterprises desire ways to prevent the release of protected data by a service provider, while still benefitting from the use of cloud-based services.

Embodiments of the present invention are directed to methods, systems, apparatuses and computer program products for cloud-based secure webmail solutions that allow an enterprise (a sender) to maintain total control of message decryption and rendering. Thus the service provider provides the majority of the operation and maintenance of the secure webmail portal but with no ability to ever see decrypted message contents.

Figure 1:
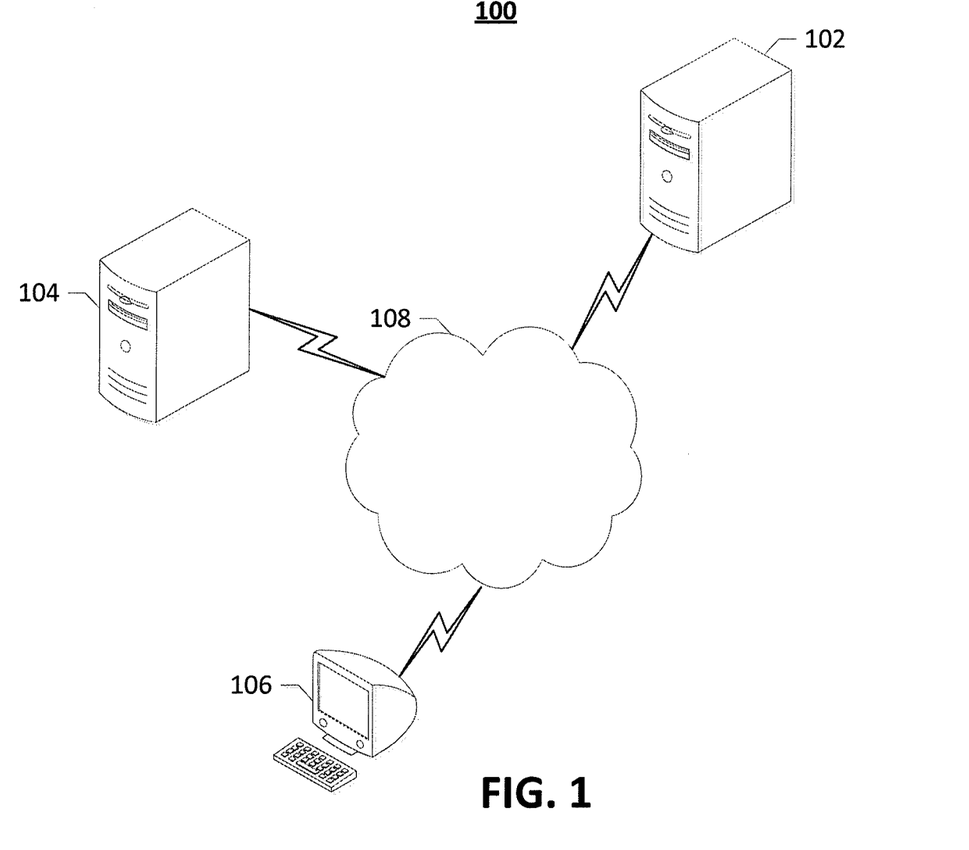
FIG. 1 is a schematic representation of a system that may benefit from example embodiments of the present invention.

Although the methods, systems, apparatuses and computer program products as described herein may be implemented in a variety of different systems, one example of such a system is system 100 shown in FIG. 1, which includes a sender system 102, a service provider system 104, and a recipient system 106. Each of a sender system 102, a service provider system 104, and a recipient system 106 may be made up of one or more devices that provide at least the features of the present invention. Sender system 102, service provider system 104, and/or recipient system 106 may be embodied by or include an apparatus, such as described in FIG. 2 below, in some example embodiments. Sender system 102, service provider system 104, and recipient system 106 may be communicatively connected using one or more networks 108.

Sender system 102 and/or service provider system 104 can include one or more servers that facilitate the transmission and delivery of email messages or other data to and/or from recipient system 106. In addition to facilitating the transmission of email messages, sender system 102 and/or service provider system 104 can be configured to provide outbound and/or inbound email security, including email encryption/decryption, anti-spam and/or anti-virus protection, filter email messages based on email address content (and/or other information) and/or detect/prevent data loss during transmission. Sender system 102 and/or service provider system 104 can include hardware, such as one or more processors, non-transitory storage media (e.g., read only memory, random access memory, etc.), and/or communications interfaces (e.g., circuitry to enable wireless, wired, optical, and/or any other type of communications). Software, firmware and/or other types of executable code may be stored by memory of sender system 102 and/or service provider system 104.

Recipient system 106 can be, for example, a personal computer that includes one or more processors, non-transitory storage media (e.g., read only memory, random access memory, etc.), and communication interfaces (e.g., circuitry to enable wireless, wired, optical, and/or any other type of communications). Recipient system 106 may also include one or more user interfaces, which in the present example include a display screen and a keyboard. Software, firmware and/or other types of executable code may be stored by memory of recipient system 106.

Recipient system 106 may also include software, firmware and/or other forms of executable code that can enable the corresponding hardware to perform the respective functions of the user devices discussed below. For example, recipient system 106 may store and run executable instructions that enables recipient system 106 to generate, send and receive emails (locally and/or using web-based applications), access and download network content, conduct VoIP communications, send and/or receive SMS messages, among other things. Although recipient system 106 is shown in FIG. 1 as being a personal computer, recipient system 106 can be any type of network device or combination of devices, including one or more wireless telephones, personal digital assistants, laptop computers, tablet computers, among others, that the user may use to, e.g., send and receive email messages.

Sender system 102, service provider system 104, and/or recipient system 106 can be configured to communicate with network 108. Network 108 is shown in FIG. 1 as being a public network, such as the Internet, but may also or alternatively include any other type of network, such as a secured intranet, a cellular network, a direct connection, any other type of network or communications connection, or a combination thereof. Network 108 can include one or more network devices, such as domain name system ("DNS") resources, that facilitate the transmission of emails across public networks. For example, network 108 can include infrastructure that associates domain names with networking equipment for the purpose of addressing these devices worldwide by translating human-readable domain names (e.g., zix.com) to a corresponding internet protocol ("IP") address. A user, for example, can enter a uniform resource locator ("URL") into a web browser running on recipient system 106, and recipient system 106 can be configured to communicate with network 108 and download content associated with the URL.

Sender system 102 can be configured to, among other things, generate, send and receive emails (locally and/or using web-based applications), access, download, and upload network content, encrypt and decrypt protected content, verify whether a recipient system, such as recipient system 106, is authorized to access, receive, and/or send protected content, and/or perform any other function related to protected content.

Service provider system 104 can be configured to, among other things, generate, send and receive emails and other data content, encrypt and decrypt data, store, upload, and download data, generate and send notifications, configure and provide web interfaces, provide authentication services, and/or perform any other function related to protected content.

Figure 2:
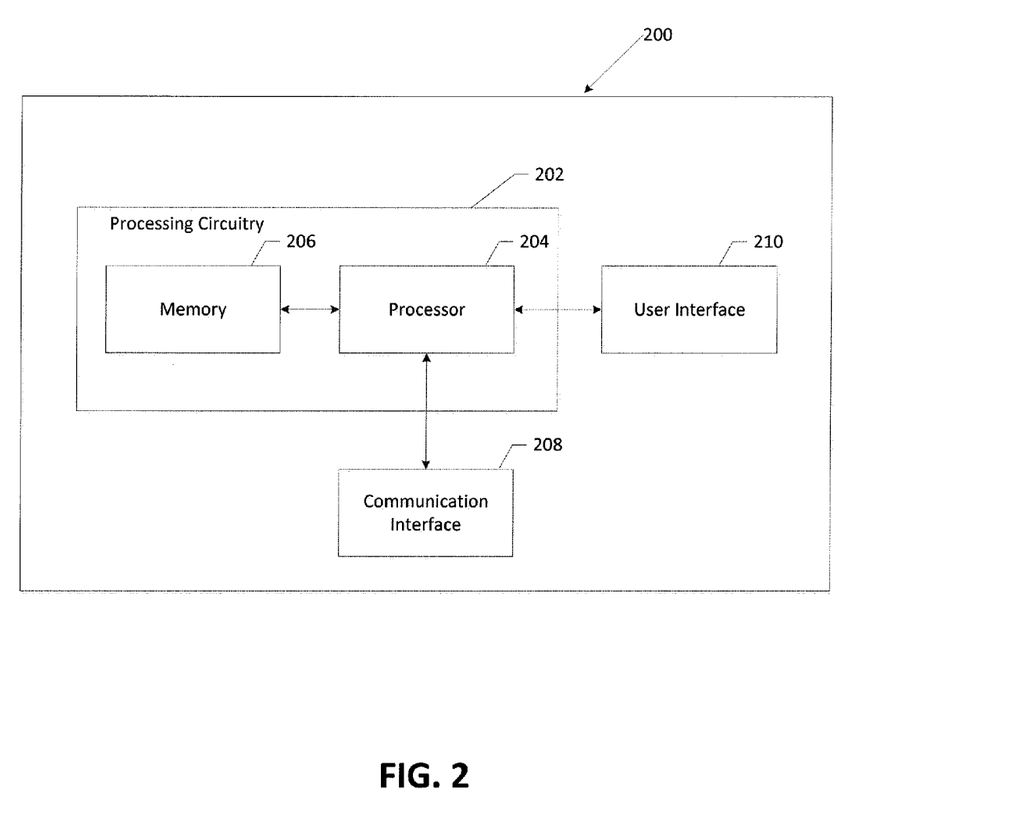
FIG. 2 is a block diagram of an apparatus that may be embodied by or included as part of a system in accordance with some example embodiments of the present invention.

To facilitate the sending and/or receiving of email messages and other data, sender system 102 and service provider system 104 can, for example, be configured to implement the simple mail transfer protocol ("SMTP"), the post office protocol ("POP"), the internet message access protocol ("IMAP"), hypertext transfer protocol ("HTTP"), and/or any other suitable protocol. FIG. 2 shows a block diagram that generically represents an apparatus that may be embodied within systems in accordance with some example embodiments of the present invention and capable of performing operations of the present invention. It should be noted that the components, devices or elements described below may not be mandatory and thus some may be omitted in certain embodiments. Additionally, some embodiments may include further or different components, devices or elements beyond those shown and described herein.

FIG. 2 shows a general block diagram of some example embodiments of an apparatus in accordance with some example embodiments described herein. Apparatus 200 may, for instance, embodied by any or all of sender system 102, service provider system 104, and/or recipient system 106. For example, in an embodiment of service provider system 104, one or more apparatuses such as apparatus 200 may perform operations such as those described in regard to FIG. 3 below. In an embodiment of sender system 102, one or more apparatuses such as apparatus 200 may perform operations such as those described in regard to FIG. 4 below. In an embodiment of recipient system 106, one or more apparatuses such as apparatus 200 may perform operations such as those described in regard to FIG. 5 below.

As shown in FIG. 2, the apparatus 200 may include or otherwise be in communication with processing circuitry 202 that is configurable to perform operations in accordance with example embodiments described herein. The processing circuitry may be configured to perform data processing, application execution and/or other processing and management services according to an example embodiment of the present invention. In some embodiments, the processing circuitry may be embodied as a circuit chip (e.g., an integrated circuit chip) configured (e.g., with hardware, software, or a combination of hardware and software) to perform operations as described herein. In some embodiments, processing circuitry 202 may be embodied as a portion of a laptop computer, workstation, mobile telephone, or other type of computing device(s).

In some example embodiments, the processing circuitry 202 may include one or more processors 204 and one or more memory 206 that may be in communication with or otherwise control one or more communication interfaces 208 and, in some cases, a user interface 210.

The user interface 210 (if implemented) may be in communication with the processing circuitry 202 to receive an indication of a user input at the user interface and/or to provide an audible, visual, mechanical or other output to the user. As such, the user interface may include, for example, a keyboard, a mouse, a trackball, a display, a touch screen, a microphone, a speaker, and/or other input/output mechanisms. The apparatus 200 need not always include a user interface, or in situations where processing circuitry 202 is embodied as a server or at a remotely located device, user interface 210 may be disposed at another device that may be in communication with processing circuitry 202 via a communication interface 208 and/or a network (e.g., network 108).

The communication interface 208 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 108 and/or any other device or module in communication with the processing circuitry 202. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, memory 206 may include one or more non-transitory storage media such as, for example, volatile and/or non-volatile memory that may be either fixed or removable. The memory may be configured to store information, data, applications, instructions or the like for enabling the apparatus 200 to carry out various functions in accordance with example embodiments of the present invention. For example, the memory could be configured to buffer input data for processing by the processor 204. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 204 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in memory 206 or otherwise accessible to the processor. As such, whether configured by hardware or by a combination of hardware and software, the processor 206 may represent an entity (e.g., physically embodied in circuitry—in the form of processing circuitry 202) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
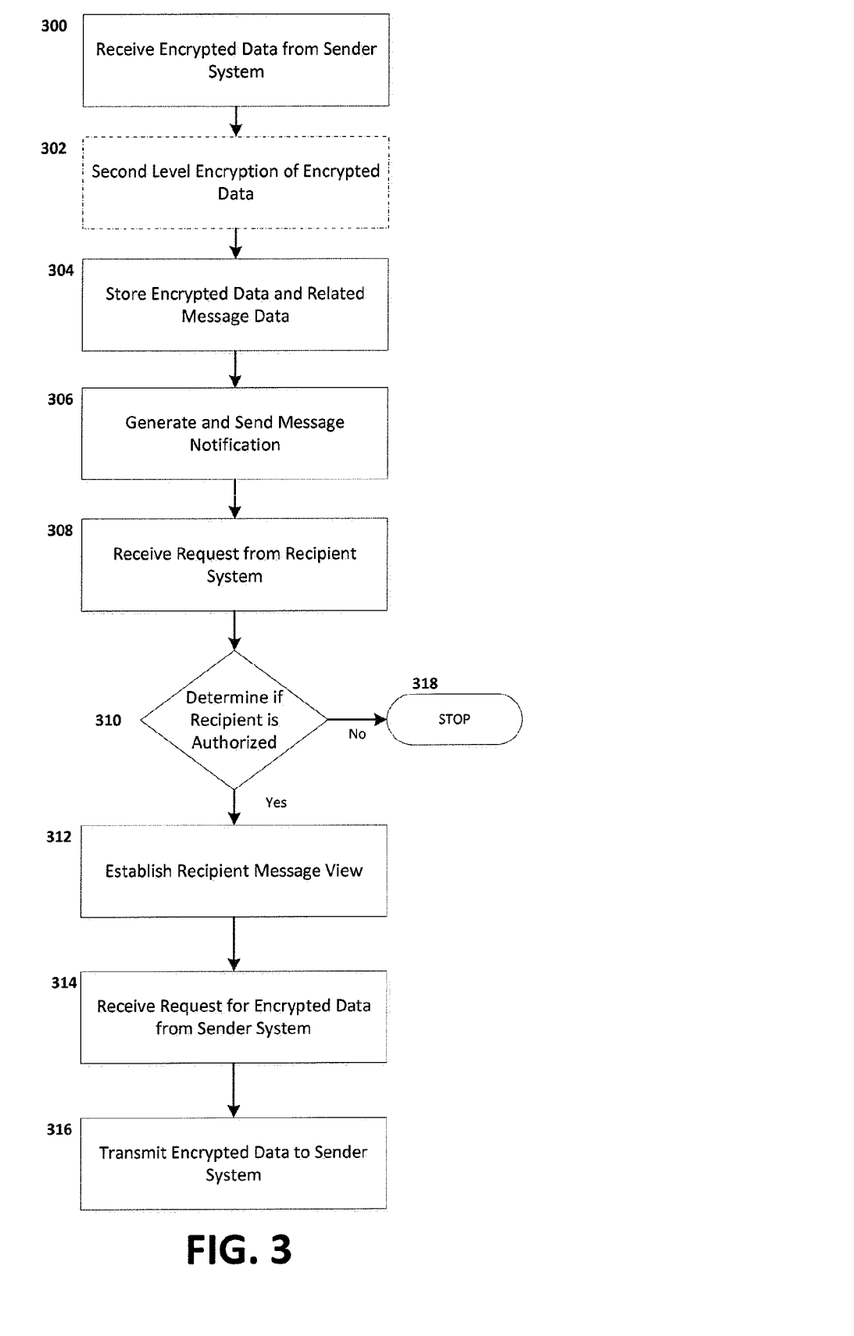
FIG. 3 is a flow chart illustrating operations performed by an example service provider system in accordance with some example embodiments of the present invention.

FIG. 3 illustrates operations performed by a service provider system, such as service provider system 104, according to some example embodiments of the present invention. While described in terms of a single system, service provider system may comprise multiple systems and may be made up of one or more apparatuses that provide the operations described below. At operation 300, service provider system 104 receives data from sender system 102, the data having been encrypted by sender system 102. At operation 302, in some embodiments, service provider system 104 may optionally apply a second level of encryption to the data. At operation 304, service provider system 104 stores the encrypted data in message store 608 and stores related message data in database 610. At operation 306, service provider system 104 generates a message notification and causes the message notification to be sent to a recipient system 106. At operation 308, service provider system 104 receives a request from recipient system 106 for a secure portal to retrieve the data. At operation 310, service provider system 104 determines if the recipient system is authorized to receive the data. For example, service provider system 104 may receive authentication credentials from recipient system 106 and transmit the authentication credentials to sender system 102 to determine if the recipient system is authorized to receive the data. Alternatively, recipient system 106 may provide authentication credentials directly to sender system 102 or another system, without service provider system 104 acting as intermediary. Recipient authentication may be provided using single sign-on (SSO), such as, but not limited to, Security Assertion Markup Language (SAML), one-time password (OTP) token, Kerberos based SSO, smart card based SSO, and any other industry standard or proprietary SSO.

Service provider system 104 may receive authentication data from sender system 102 indicating that the authentication credentials from recipient system 106 are valid and then establish a secure webmail portal message view for recipient system 106 at operation 312. Alternatively, service provider system 104 may determine recipient authentication, such as using SSO, internally at service provider system 104 rather than sending recipient credentials to sender system 102. At operation 314, service provider system 104 receives a request from sender system 102 for the encrypted data. Service provider system 104 may receive information, such as a message ID, a portal ID, and a recipient email address, from sender system 102 to determine if sender system 102 is authorized to retrieve the requested encrypted data. At operation 316, service provider system 104 causes the encrypted data to be transmitted to sender system 102. If, at operation 310, service provider system 104 determines that recipient system 106 is not authorized to receive the data, the process will end at operation 318.

By only handling the transmission and storage of the data in its encrypted form and never having access to the sender's decryption key, the service provider is unable to access or compromise the transmitted data, either intentionally or accidently, providing improved security for the data and providing enterprises a higher level of comfort in using the cloud services operated by the service provider.

Figure 4:
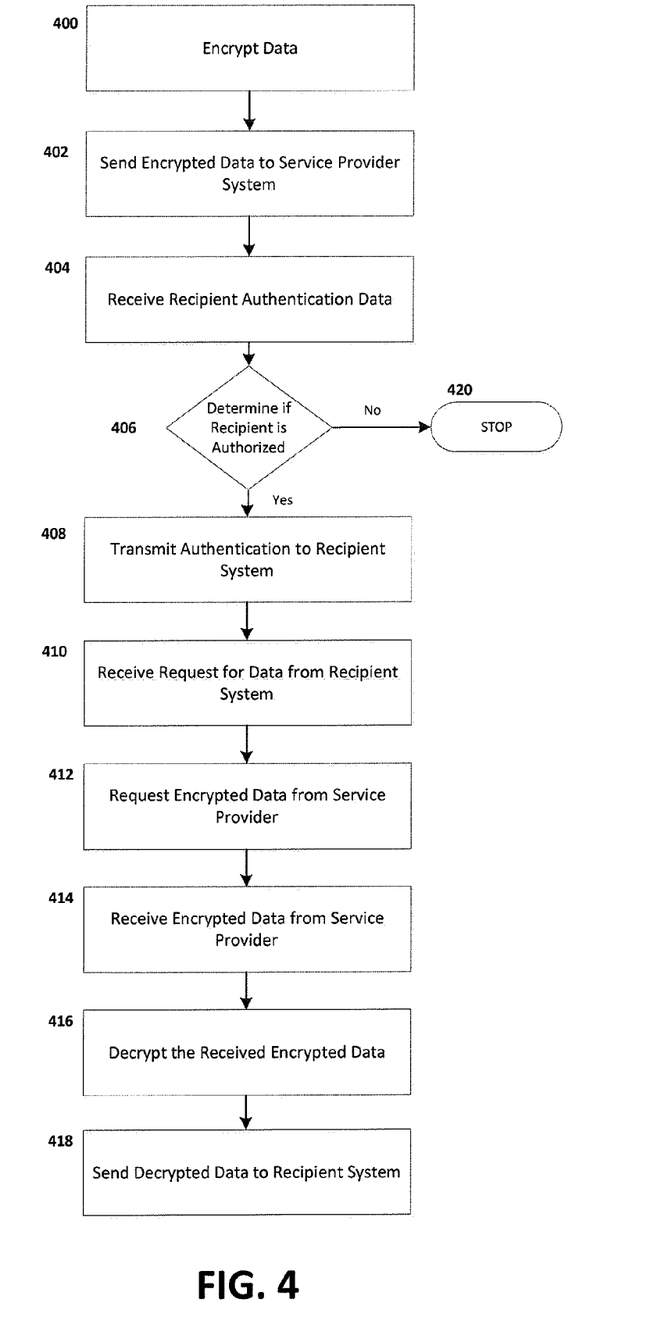
FIG. 4 is a flow chart illustrating operations performed by an example sender system in accordance with some example embodiments of the present invention.

FIG. 4 illustrates operations performed by a sender system, such as sender system 102, according to some example embodiments of the present invention. While described in terms of a single system, sender system may comprise multiple systems and may be made up of one or more apparatuses that provide the operations described below. At operation 400, sender system 102 encrypts data to be sent to a recipient. At operation 402, sender system 102 causes the encrypted data to be sent to service provider system 104. Optionally, at operation 404, sender system 102 may receive recipient authentication credentials. Optionally at operation 404, sender system 102 may determine if recipient authentication credentials are valid. Recipient authentication may be provided using SSO, such as, but not limited to, SAML, OTP token, Kerberos based SSO, smart card based SSO, and any other industry standard or proprietary SSO. If recipient authentication credentials are valid, sender system 102 may cause authentication data to be transmitted to service provider system 104 at operation 408. At operation 410, sender system 102 receives a request from recipient system 106 for the decrypted data. At operation 412, sender system 102 causes a request for the encrypted data to be transmitted to service provider system 104. At operation 414, sender system 102 receives the encrypted data from service provider system 104. At operation 416, sender system 102 decrypts the encrypted data. At operation 418, sender system 102 causes the decrypted data to be sent to recipient system 106. If, at operation 406, sender system 102 determines that recipient authentication credentials are invalid, the process stops at operation 420.

Because the sender system 102 provides all the base encryption and decryption operations, and shares the decrypted data with the recipient through a secure connection which the service provider cannot view, the sender maintains full control of the security of the data and as such, the service provider is unable to intentionally or accidentally compromise the protected data.

Figure 5:
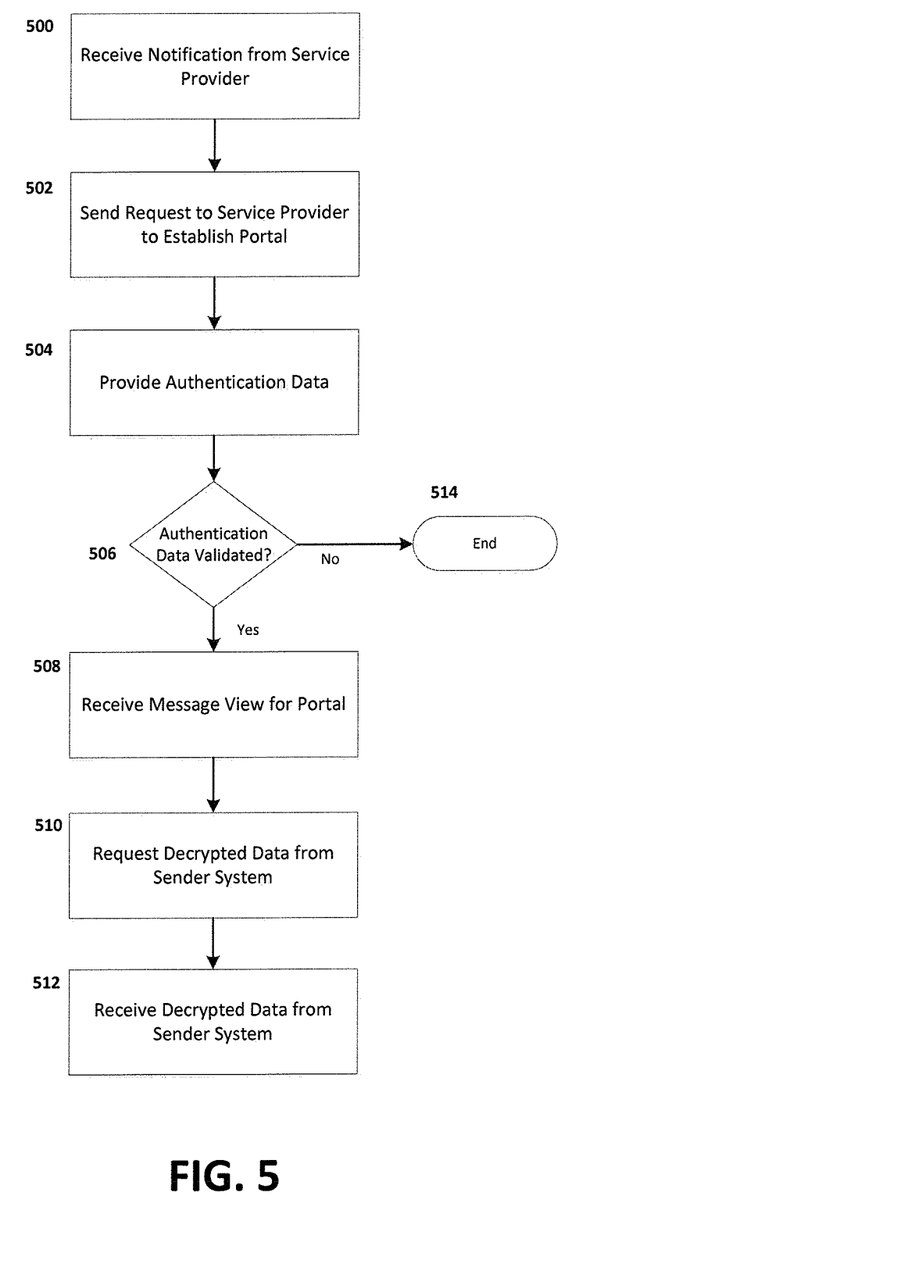
FIG. 5 is a flow chart illustrating operations performed by an example recipient system in accordance with some example embodiments of the present invention.

FIG. 5 illustrates operations performed by a recipient system, such as recipient system 106, according to some example embodiments of the present invention. While described in terms of a single system, recipient system may comprise multiple systems and may be made up of one or more apparatuses that provide the operations described below. At operation 500, recipient system 106 receives a message notification from service provider system 104. At operation 502, recipient system 106 causes a request to be transmitted to service provider system 104 to establish a secure webmail portal. The request may be generated by a user at recipient system 106 clicking a url reference link included with the message notification sent from service provider system 104. At operation 504, recipient system 106 causes recipient authentication credentials to be transmitted. Recipient authentication may be provided using SSO, such as, but not limited to, SAML, OTP token, Kerberos based SSO, smart card based SSO, and any other industry standard or proprietary SSO. At operation 506, recipient system 106 receives authentication data validating the recipient authentication credentials. At operation 508, recipient system 106 is provided a message view for the secure webmail portal from service provider system 104. At operation 510, recipient system 106 transmits a request for the decrypted data to sender system 102. At operation 512, recipient system 106 receives the decrypted data from sender system 102. If, at operation 506, the recipient authentication credentials are not validated, the process ends at operation 516. As a result of the described operations, a recipient may be able to receive and view protected data without the need to purchase or maintain encryption and decryption capabilities.

FIGS. 3-5 illustrate example operations performed by a methods, apparatuses, and computer program products in accordance with some embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 206 of an apparatus 200 employing an embodiment of the present invention and executed by a processor 204 in the apparatus 200. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-5 when executed, convert a computer or processing circuitry into a particular machine configured to perform an example embodiment of the present invention. Accordingly, the operations of FIGS. 3-5 define an algorithm for configuring a computer or processing circuitry 202, e.g., a processor, to perform an example embodiment. In some cases, a general purpose computer may be provided with an instance of the processor which performs the algorithm of FIGS. 3-5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Figure 6:
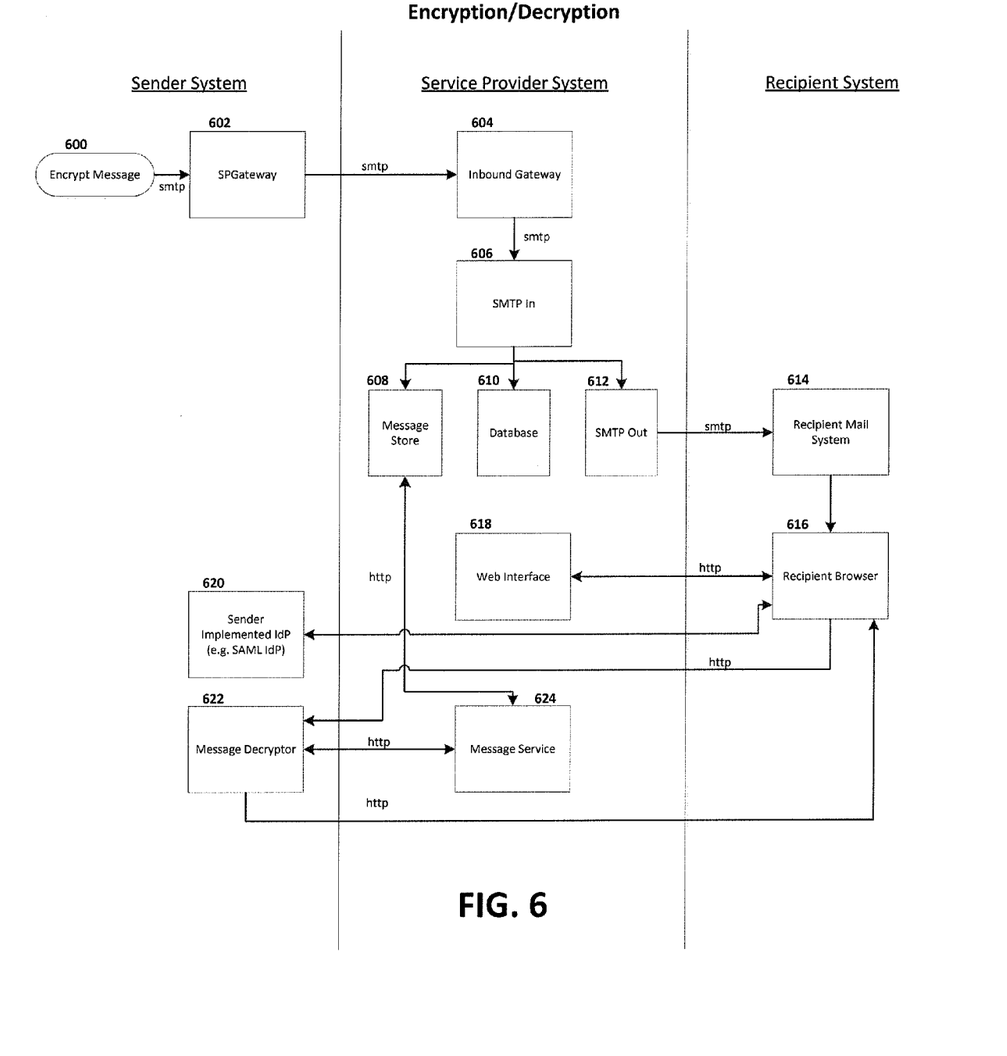
FIG. 6 is an example embodiment of the process facilitating the transmission of secure messages between a sender system and a recipient system.

FIG. 6 shows one example embodiment for providing secure data transmission between sender system 102 and recipient system 106 by using services provided by service provider system 104. In this regard, FIG. 6 describes an exemplary embodiment of systems performing the operations of FIGS. 3-5 as provided above.

At sender system 102, a sender generates an email message 600, the message may be encrypted using SMIME with a public key of Message Decryptor 622, and then transmitted to an enterprise-located Gateway 602. The enterprise-located Gateway 602 may encrypt the message with standard Gateway SMIME before transmission to the Inbound Gateway 604 of service provider system 104. If the received message was encrypted with a Gateway SMIME layer, the message is decrypted by sender system 104. The message is then delivered to SMTP In 606. The received message remains encrypted with the original sender encryption which cannot be decrypted by the service provider. SMTP In 606 saves the encrypted message in Message Store 608 and inserts message-related data into database 610. A recipient message notification is generated and provided to SMTP Out 612. SMTP Out 612 transmits the message notification to recipient mail system 614 which delivers the message notification to the recipient's inbox. Message store 608 may also encrypt the sender encrypted message with an additional layer of encryption before storing.

A recipient may view the message notification in his inbox and click a url link to access the secure webmail portal. Recipient browser 616 requests the service provider login servlet from the service provider web interface 618. The secure webmail portal for the recipient is configured with SSO enabled. Web interface 618 detects the portal is SSO and redirects the request to the Shibboleth Session Initiator. Shibboleth Session Initiator redirects the recipient browser 616 to the Sender Implemented IdP 620 for authentication. Sender Implemented IdP 620 determines if the recipient is authorized and authenticates recipient browser 616. Recipient browser 616 is redirected back to the service provider web interface 618 with a SAML assertion. The SAML assertion is validated by the service provider and the recipient browser 616 is redirected to the message view. The message view in recipient browser 616 will contain an iFrame that will retrieve the message body from Message Decryptor 622 hosted on the sender system 102. The service provider, as well as other third parties, will be unable to see the data that is shared within the iFrame of the message view as it is provided through a secure connection between the sender system and the recipient system.

Recipient browser 616 requests the decrypted message from the Message Decryptor 622. The Message Decryptor 622 uses SAML to authenticate the request from the recipient browser 616. The Message Decryptor 622 initiates the SAML session and redirects the recipient browser 616 to the Sender Implemented IdP 620. A SAML session will already exist for the user and Sender Implemented IdP 620 will redirect recipient browser 616 to Message Decryptor 622 with the SAML assertion. The SAML assertion is validated by the Message Decryptor 622.

Message Decryptor 622 will request the encrypted SMIME message from the Message Service 624 of the service provider system 104. Message Service 624 will be given information such as a message ID, portal ID and recipient email address that was passed to the Message Decryptor 622 in the iFrame URL from recipient browser 616. Message Service 624 will authenticate the calling Message Decryptor 622 to ensure that the message being requested is for an authenticated recipient and webmail portal and that Message Decryptor 622 is authorized to retrieve messages for that webmail portal.

Once Message Service 624 authenticates the request, Message Service 624 will retrieve the encrypted message from Message Store 608 and return it to the Message Decryptor 622. Message Decryptor 622 will decrypt the message with its private key and return the plain text message to the iFrame in recipient browser 616. Because decryption occurs in sender system 102 and the message is requested by recipient browser 616 and displayed in recipient browser 616 through a secure connection, the service provider never sees the decrypted message. If Message Store 608 encrypted the message with an additional layer of encryption before storing, that additional layer of encryption will be decrypted before sending the originally encrypted message to Message Decryptor 622.

Message Decryptor 622 may keep the decrypted message in memory in the active browser session for recipient browser 616 such that subsequent requests for the message and/or attachments can be returned to recipient browser 616 immediately.

As a result of these operations, a sender can maintain full control of their protected data because a service provider never sees the decrypted content and never has the sender's decryption key. Additionally, the sender and recipient receive the benefits of the cloud service provided by the service provider eliminating the need for the sender and recipient to have matching encryption and decryption capabilities.

Figure 7:
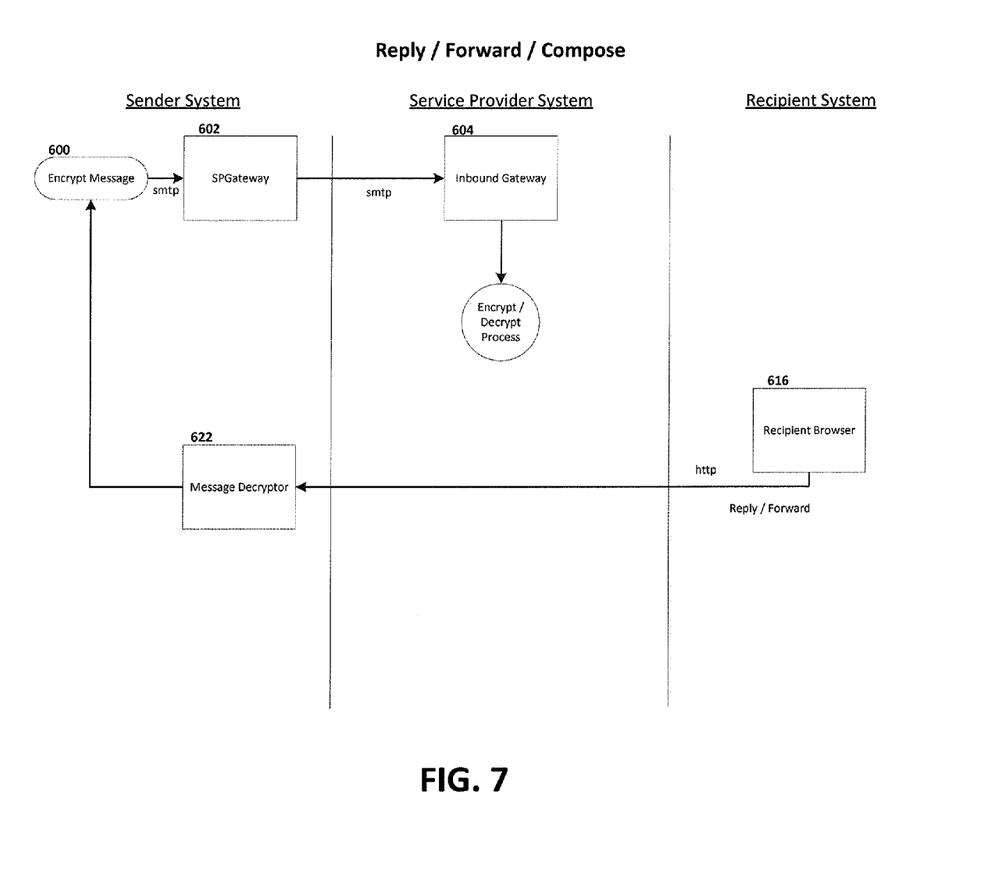
FIG. 7 is another example embodiment of the process facilitating the transmission of secure messages between a sender system and a recipient system.

FIG. 7 shows a further example embodiment for providing secure data transmission between sender system 102 and recipient system 106 by using services provided by service provider system 104, where a recipient may be replying to the original message from sender system 102. A user may compose a message in response to data received from sender system 102 through recipient browser 616. Recipient browser 616 transmits the response message to Message Decryptor 622. Message Decryptor 622 generates a MIME message from the response message and proceeds with the encryption/decryption process as described above in relation to FIG. 6. As such, the recipient's response message will be provided the same level of secure transmission as the original sender data. Therefore, a service provider will not be able to access or compromise the security of the data, providing users a higher level of comfort when using cloud services.

Figure 8:
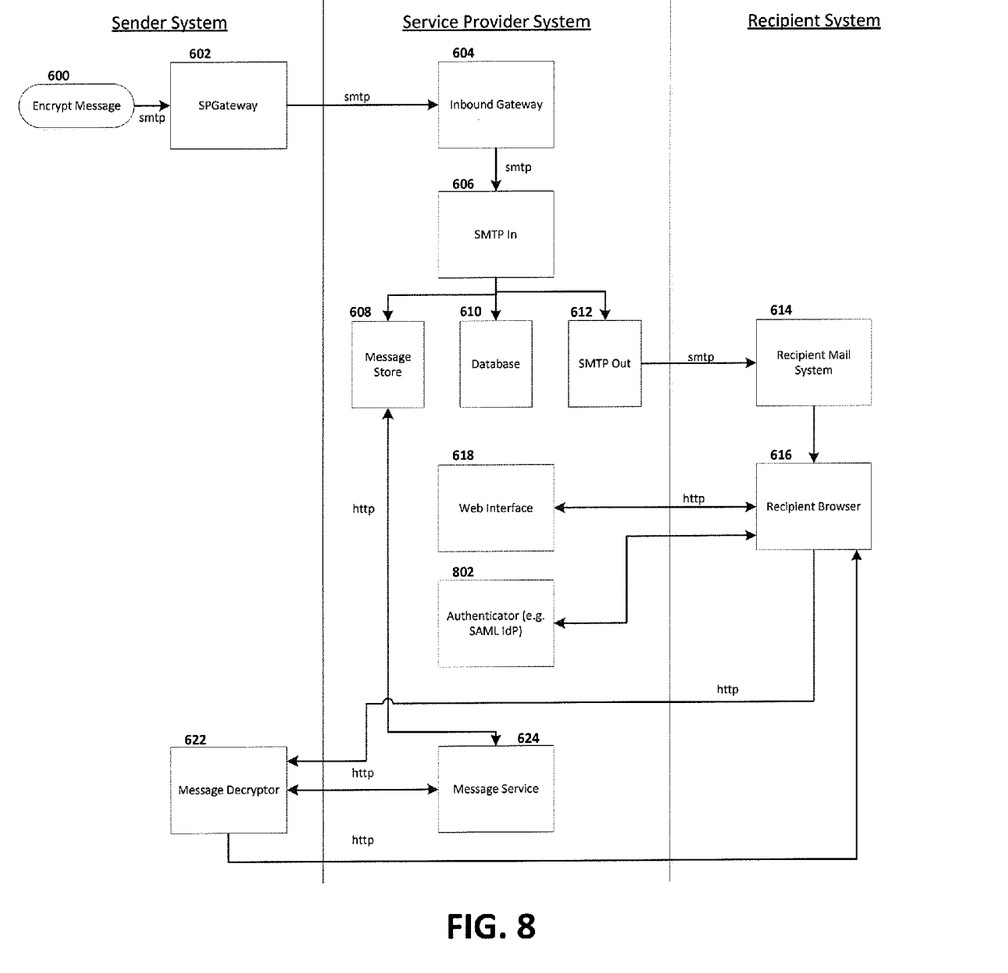
FIG. 8 shows a further example embodiment of the process facilitating the transmission of secure messages between a sender system and a recipient system.

FIG. 8 shows a further example embodiment for providing secure data transmission between sender system 102 and recipient system 106 by using services provided by service provider system 104, where authentication may be provided at service provider system 104. In FIG. 8, the features shown are identical to those described above with respect to FIG. 6, except for the authentication of the recipient, and as such, only those features will be described here.

In FIG. 8, upon requesting the service provider login servlet from the service provider web interface 618, the recipient browser 616 is redirected to Authenticator 802. Authenticator 802 determines if the recipient is authorized and authenticates recipient browser 616. Recipient authentication may be provided using SSO, such as, but not limited to, SAML, OTP token, Kerberos based SSO, smart card based SSO, and any other industry standard or proprietary SSO. Recipient browser 616 is redirected back to the service provider web interface 618 and the message view.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

That which is claimed:

1. A method of storing and facilitating secure transmission of data comprising:
   receiving, by a processor of a service provider system, data encrypted by a sender system, wherein the service provider lacks the capability of decrypting the data as encrypted by the sender system;
   storing, by the service provider system, the data as encrypted by the sender system;
   receiving, by the service provider system, a request for the data, the request for the data received from a recipient system and independently of the sender system;
   receiving, by the service provider system, authentication data, the authentication data received from the recipient system;
   transmitting, by the service provider system, the authentication data, the authentication data transmitted to the sender system;
   receiving, by the service provider system, an indication that the authentication data is valid, the indication received from the sender system;
   as a result of receiving the indication that the authentication data is valid, determining the recipient system is authorized to receive the data; and
   as a result of determining the recipient system is authorized to receive the data, transmitting the data as encrypted by the sender system, the data transmitted from the service provider system to the sender system configured to decrypt and transmit the data to the recipient system.

2. The method according to claim 1, further comprising providing a public key to the sender system prior to receiving the data as encrypted.

3. The method according to claim 1, further comprising encrypting the data a second time, by the service provider system, after receiving the data as encrypted from the sender system and prior to storing the data.

4. The method according to claim 3, wherein the data is encrypted with at least two layers of encryption and, prior to transmitting the data as encrypted, decrypting one of the at least two layers of encryption.

5. The method according to claim 4, wherein a first of the at least two layers of encryption includes using a first public key associated with the sender system and a second of the at least two layers of encryption includes using an encryption key associated with the service provider system.

6. The method according to claim 1, wherein determining the recipient system is authorized to receive the data further comprises using single sign-on authentication.

7. The method according to claim 1, wherein the data represents a body of an email message.

8. The method according to claim 1, wherein the data encrypted by the sender system comprises data from the recipient system received by the sender system.

9. A computer program product comprising a non-transitory computer readable storage medium and computer program instructions stored therein, the computer program instructions comprising program instructions that, when executed by a processor of a service provider system, are configured to cause the service provider system to at least:
   receive, by the processor of the service provider system, data encrypted by a sender system, wherein the service provider lacks the capability of decrypting the data as encrypted by the sender system;
   store, by the service provider system, the data as encrypted by the sender system;
   receive, by the service provider system, a request for the data, the request for the data received from a recipient system and independently of the sender system;
   receive, by the service provider system, authentication data, the authentication data received from the recipient system;
   transmit, by the service provider system, the authentication data, the authentication data transmitted to the sender system;
   receive, by the service provider system, an indication that the authentication data is valid, the indication received from the sender system;
   as a result of receiving the indication that the authentication data is valid, determine the recipient system is authorized to receive the data; and
   as a result of determining the recipient system is authorized to receive the data, transmit the data as encrypted by the sender system, the data transmitted from the service provider system to the sender system configured to decrypt and transmit the data to the recipient system.

10. A method of secure transmission of data between a sender system and a recipient system comprising:
    encrypting data by a processor of a sender system;
    transmitting, by the sender system, the data as encrypted, the data as encrypted transmitted to a service provider system that lacks the capability of decrypting the data as encrypted by the sender system, wherein the service provider system is distinct from the sender system;
    receiving, by the sender system, authentication data generated by a recipient system and received from the service provider system;
    determining, by the sender system, that the authentication data is valid;
    transmitting, by the sender system, an indication that the authentication is valid, the indication transmitted to the service provider system;
    in response to transmitting the indication that the authentication data is valid, receiving, by the sender system, the data as encrypted by the sender system and received from the service provider system;
    decrypting, by the sender system, the data; and
    transmitting, by the sender system, the data as decrypted to the recipient system.

11. The method according to claim 10, further comprising receiving the data as encrypted from the service provider system as a result of the sender system receiving a request for the decrypted data from a recipient and requesting the data as encrypted from the service provider system.

12. The method according to claim 10, wherein the authentication data comprises single-sign authentication.

13. The method according to claim 10, wherein encrypting the data by the sender system, includes encrypting the data once using a first public key and encrypting the data again using a second public key that is different than the first public key.

14. The method according to claim 13, wherein receiving the data as encrypted from the service provider system, comprises receiving the data as encrypted by the first public key and decrypted by a private key associated with the second public key.

15. The method according to claim 13, wherein decrypting the data comprises using a private key associated with the first public key.

16. The method according to claim 10, wherein transmitting the data as decrypted comprises transmitting the data over a network using a secure protocol established between the sender system and recipient system.

17. The method according to claim 16, further comprising generating a body of an email message based on the data.

18. The method according to claim 10, wherein the data encrypted by the sender system comprises data from a recipient system received by the sender system.

19. The method according to claim 10, wherein transmitting the data as decrypted occurs within an iFrame.

20. A computer program product comprising a non-transitory computer readable storage medium and computer program instructions stored therein, the computer program instructions comprising program instructions that, when executed by a processor of a sender system, are configured to cause the sender system to at least:
encrypt data by the processor of the sender system;
transmit, by the sender system, the data as encrypted, the data as encrypted transmitted to a service provider system that lacks the capability of decrypting the data as encrypted by the sender system, wherein the service provider system is distinct from the sender system;
receive, by the sender system, authentication data generated by a recipient system and received from the service provider system;
determine, by the sender system, that the authentication data is valid;
transmit, by the sender system, an indication that the authentication is valid, the indication transmitted to the service provider system;
in response to transmitting the indication that the authentication data is valid, receive, by the sender system, the data as encrypted by the sender system and received from the service provider system;
decrypt, by the sender system, the data; and
transmit, by the sender system, the data as decrypted to the recipient system.

21. A method of receiving data from a sender system at a recipient system comprising:
receiving, by a recipient system, a user input associated with retrieving data from a service provider system, wherein the service provider system stores the data that has been encrypted by a sender system, the service provider system lacks the capability of decrypting the data as encrypted by the sender system, and the service provider system is distinct from the sender system;
providing, by a processor of the recipient system, authentication data, the authentication data provided to the service provider system, wherein the service provider system is operable to transmit the authentication data to the sender system, receive an indication that the authentication data is valid from the sender system, and as a result of receiving the indication that the authentication data is valid, transmit the data as encrypted to the sender system; and
receiving, by the recipient system, the data, wherein the data is received from the sender system and the data has been decrypted by the sender system in response to the sender system having received the data as encrypted from the service provider system.

22. The method according to claim 21, further comprising rendering a display based on the data as decrypted using a web browser.

23. The method according to claim 21, wherein receiving the data as decrypted from the sender system is performed using a secure protocol over a network.

24. The method according to claim 21, the data as decrypted is received within an iFrame.

25. The method according to claim 21, wherein the data represents a body of an email message.

26. The method according to claim 21, wherein recipient system comprises a mobile device communicating through a cellular network.

27. The method according to claim 21, further comprising:
receiving, by a recipient system, a user input associated with creating response data in response to the data received from a sender system; and
transmitting the response data to the sender system.

28. The method according to claim 21, wherein the authentication data comprises single sign-on authentication.

29. A computer program product comprising a non-transitory computer readable storage medium and computer program instructions stored therein, the computer program instructions comprising program instructions that, when executed by a processor of a recipient system, are configured to cause the recipient system to at least:
receive, by the recipient system, a user input associated with retrieving data from a service provider system, wherein the service provider system stores the data that has been encrypted by a sender system, the service provider system lacks the capability of decrypting the data as encrypted by the sender system, and the service provider system is distinct from the sender system;
provide, by the processor of the recipient system, authentication data, the authentication data provided to the service provider system, wherein the service provider system is operable to transmit the authentication data to the sender system, receive an indication that the authentication data is valid from the sender system, and as a result of receiving the indication that the authentication data is valid, transmit the data as encrypted to the sender system; and
receive, by the recipient system, the data, wherein the data is received from the sender system and the data has been decrypted by the sender system in response to the sender system having received the data as encrypted from the service provider system.

30. An apparatus comprising:
at least one processor; and
at least one memory including computer program code, the at least one memory and the computer program code configured to, with the at least one processor, cause the apparatus to at least:
receive, by a processor of a service provider system, data encrypted by a sender system, wherein the service provider system lacks the capability of decrypting the data as encrypted by the sender system;

store, by the service provider system, the data as encrypted by the sender system;

receive, by the service provider system, a request for the data, the request for the data received from a recipient system and independently of the sender system;

receive, by the service provider system, authentication data, the authentication data received from the recipient system;

transmit, by the service provider system, the authentication data, the authentication data transmitted to the sender system;

receive, by the service provider system, an indication that the authentication data is valid, the indication received from the sender system;

as a result of receiving the indication that the authentication data is valid, determine the recipient system is authorized to receive the data; and as a result of determining the recipient system is authorized to receive the data, transmit the data as encrypted by the sender system, the data transmitted from the service provider system to the sender system configured to decrypt and transmit the data to the recipient system.

31. The apparatus according to claim 30, further comprising the at least one memory and the computer program code configured to, with the at least one processor, cause the apparatus to at least provide a public key to the sender system prior to receiving the data as encrypted.

32. The apparatus according to claim 30, further comprising the at least one memory and the computer program code configured to, with the at least one processor, cause the apparatus to at least encrypt the data a second time after receiving the data as encrypted from the sender system and prior to storing the data.

33. The apparatus according to claim 32, wherein the data is encrypted with at least two layers of encryption and, prior to transmitting the data as encrypted, decrypting one of the at least two layers of encryption.

34. The apparatus according to claim 33, wherein a first of the at least two layers of encryption includes using a first public key associated with the sender system and a second of the at least two layers of encryption includes using an encryption key associated with the service provider system.

35. The apparatus according to claim 33, wherein determining the recipient system is authorized to receive the data further comprises using single sign-on authentication.

36. The apparatus according to claim 30, wherein the data represents a body of an email message.

37. The apparatus according to claim 30, wherein the data encrypted by the sender system comprises data from the recipient system received by the sender system.

38. An apparatus comprising:
at least one processor; and
at least one memory including computer program code, the at least one memory and the computer program code configured to, with the at least one processor, cause the apparatus to at least:
encrypt data by a sender system;
transmit, by the sender system, the data as encrypted, the data as encrypted transmitted to a service provider system that lacks the capability of decrypting the data as encrypted by the sender system, wherein the service provider system is distinct from the sender system;
receive, by the sender system, authentication data generated by a recipient system and received from the service provider system;
determine, by the sender system, that the authentication data is valid;
transmit, by the sender system, an indication that the authentication is valid, the indication transmitted to the service provider system;
in response to transmitting the indication that the authentication data is valid, receive, by the sender system, the data as encrypted by the sender system and received from the service provider system;
decrypt, by the sender system, the data; and
transmit, by the sender system, the data as decrypted to a recipient system.

39. The apparatus according to claim 38, further comprising the at least one memory and the computer program code configured to, with the at least one processor, cause the apparatus to at least receive the data as encrypted from the service provider system as a result of the sender system receiving a request for the decrypted data from a recipient and requesting the data as encrypted from the service provider system.

40. The apparatus according to claim 38, wherein the authentication data comprises single-sign authentication.

41. The apparatus according to claim 38, wherein encrypting the data by the sender system, includes encrypting the data once using a first public key and encrypting the data again using a second public key that is different than the first public key.

42. The apparatus according to claim 41, wherein receiving the data as encrypted from the service provider system, comprises receiving the data as encrypted by the first public key and decrypted by a private key associated with the second public key.

43. The apparatus according to claim 41, wherein decrypting the data comprises using a private key associated with the first public key.

44. The apparatus according to claim 38, wherein transmitting the data as decrypted comprises transmitting the data over a network using a secure protocol established between the sender system and recipient system.

45. The apparatus according to claim 44, further comprising the at least one memory and the computer program code configured to, with the at least one processor, cause the apparatus to at least generate a body of an email message based on the data.

46. The apparatus according to claim 38, wherein the data encrypted by the sender system comprises data from a recipient system received by the sender system.

47. The apparatus according to claim 38, wherein transmitting the data as decrypted occurs within an iFrame.

48. An apparatus comprising:
at least one processor; and
at least one memory including computer program code, the at least one memory and the computer program code configured to, with the at least one processor, cause the apparatus to at least:
receive, by a recipient system, a user input associated with retrieving data from a service provider system, wherein the service provider system stores the data that has been encrypted by a sender system, the service provider system lacks the capability of decrypting the data as encrypted by the sender system, and the service provider system is distinct from the sender system;
provide authentication data, the authentication data provided to the service provider system, wherein the service provider system is operable to transmit the authentication data to the sender system, receive an indication that the authentication data is valid from the sender system, and as a result of receiving the indication that the authentication data is valid, transmit the data as encrypted to the sender system; and receive, by the recipient system, the data, wherein the data is received from the sender system and the data has been decrypted by the sender system in response to the sender system having received the data as encrypted from the service provider system.

49. The apparatus according to claim 48, further comprising rendering a display based on the data as decrypted using a web browser.

50. The apparatus according to claim 48, wherein receiving the data as decrypted from the sender system is performed using a secure protocol over a network.

51. The apparatus according to claim 48, the data as decrypted is received within an iFrame.

52. The apparatus according to claim 48, wherein the data represents a body of an email message.

53. The apparatus according to claim 48, wherein recipient system comprises a mobile device communicating through a cellular network.

54. The apparatus according to claim 48, further comprising:

receiving, by a recipient system, a user input associated with creating response data in response to the data received from a sender system; and transmitting the response data to the sender system.

55. The apparatus according to claim 48, wherein the authentication data comprises single sign-on authentication.

* * * * *